US006358341B1

(12) United States Patent
Bergquist

(10) Patent No.: US 6,358,341 B1
(45) **Date of Patent: *Mar. 19, 2002**

(54) METHOD OF USING PHOTOALBUM TEMPLATES

(76) Inventor: Alison Bergquist, 1027 W. Dorothy Dr., Brea, CA (US) 92821

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,823

(22) Filed: Mar. 19, 1999

Related U.S. Application Data

(60) Provisional application No. 60/085,558, filed on May 15, 1998.

(51) Int. Cl.[7] .......... B32B 31/00

(52) U.S. Cl. .......... 156/63; 156/256; 434/87

(58) Field of Search .......... 156/63, 256; 33/562, 33/563, 566; 434/87, 88, 85

(56) References Cited

U.S. PATENT DOCUMENTS

| | | | | | |
|---|---|---|---|---|---|
| 1,358,572 | A | * | 11/1920 | Poole | 434/87 |
| 1,541,480 | A | * | 6/1925 | Compton et al. | 33/563 |
| 1,974,442 | A | * | 9/1934 | Baldwin | 33/563 |
| D141,882 | S | * | 7/1945 | Matson | 33/565 |
| D157,458 | S | * | 2/1950 | Zagray | 33/563 X |
| 3,061,946 | A | * | 11/1962 | Carty | 33/563 |
| 4,937,949 | A | * | 7/1990 | Kiefer | 33/563 |
| 5,661,549 | A | * | 8/1997 | Crane | 355/126 |
| 5,865,928 | A | * | 2/1999 | Lariviere, Jr. et al. | |

OTHER PUBLICATIONS

Coluzzle 11 ×14 Mat Frame Template, 2 Pages, Nov. 10, 1997.*
Coluzzle Blurbs Template, 2 Pages, Nov. 10, 1997.*
Neste Coluzzle Templates, 3 Pages, Nov. 10, 1997.*
Coluzzle 11 ×11 Square Scrapbook Template, 2 Pages, Nov. 10, 1997.*
Creative Memories, “Imagine . . . lifetimes of enjoyment”, sales brochure, three pages, 1998.
Creative Memories, “Design and Layout Ideas for Scrapbook Pages 1995”, pp. 47, 56, and 57, 1995.*
Creative Memories , “Design and Layout Ideas for Scrapbook 1996”, pp. 7 and 11, 1996.*
Creative Memories, “Printed Paper Collection” sales brochure, three pages, 1997.*
Creative Memories, “Your Priceless Photographs . . . ” sales brochure, three pages, 1995.*
Picture Puzzles by Our Moment in Time pp. 1–5 from the web site “www.ourmomentintime.com”, date unknown.*

* cited by examiner

*Primary Examiner*—Jeff H. Aftergut
(74) *Attorney, Agent, or Firm*—Fish & Associates, LLP; Robert D. Fish

(57) ABSTRACT

Templates having sets of frame, channel, and possibly “dot” cutouts, and methods for using such templates for shaping and laying out photographs on a page to create a decorative pattern.

9 Claims, 9 Drawing Sheets

FIG. 11
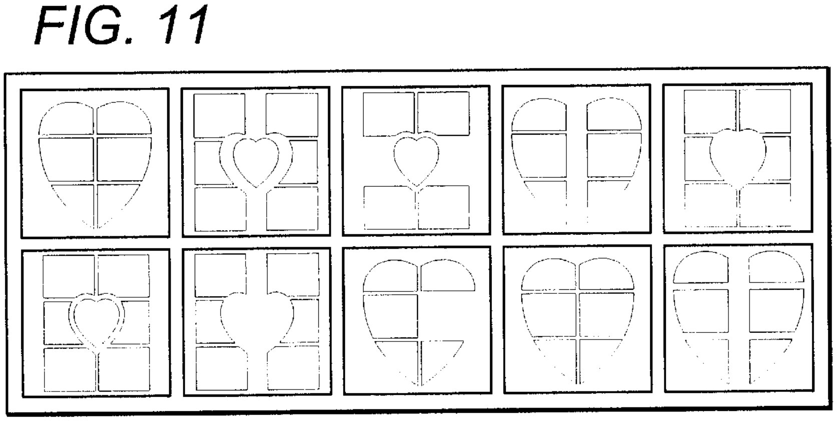
FIG. 12
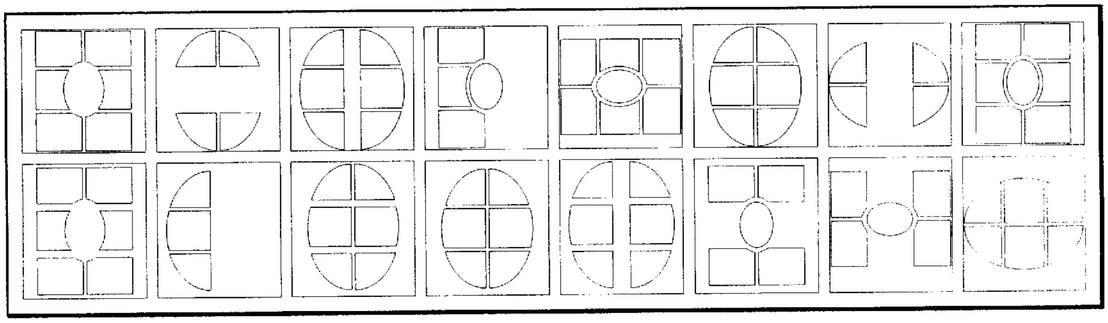
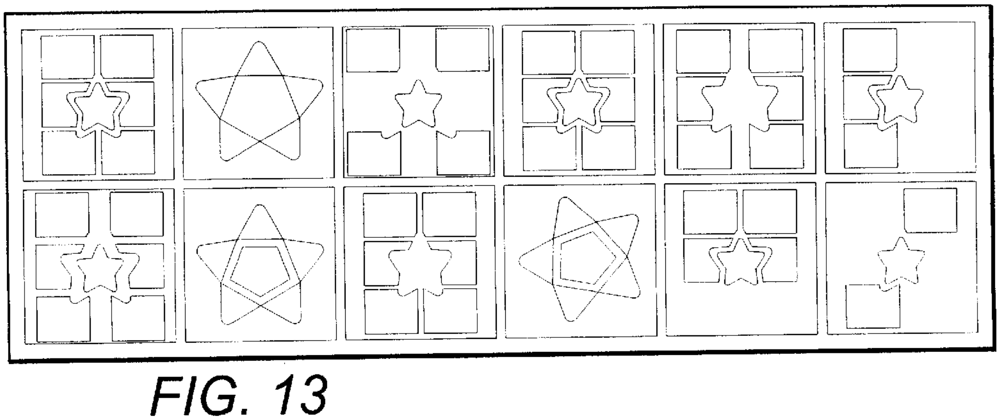
FIG. 13

METHOD OF USING PHOTOALBUM TEMPLATES

This application claims the benefit of U.S. provisional application No. 60/085,558 filed May 15, 1998, incorporated herein by reference in its entirety.

FIELD OF THE INVENTION

The field of the invention is crafts, and especially photo albums.

BACKGROUND OF THE INVENTION

Considerable resources have been invested over the last few years to make photo album arranging one of the more popular hobbies for women. Nevertheless, despite the popularity of the field, the tasks involved are still somewhat difficult and tedious. Among other things, photo album arranging is difficult because craftspeople tend to desire many different patterns; patterns that are readily reproducible, and patterns that can be readily derivated. Other difficulties arise from a desire to produce the patterns at low cost, and without wasting materials. Still other difficulties arise from a desire to produce patterns which are aesthetically appealing, and preferably also generally symmetrical.

One method of arranging photographs in a photo album involves providing the photo album pages with slits at pre-selected points. The corners of photographs are then inserted into the slits. This method allows arranging of photographs in symmetrical, reproducible patterns, but is generally unaesthetic and unappealing.

Another method uses plastic pockets to receive the photographs. This method is adapted to hold a set number of photographs of a given size, number and orientation, but is generally too limiting. Among other things, the pocket method tends to require either landscape or portrait orientations, and in poorly adapted to allow expressions of creativity.

Still another method involves a tacky surface generally covered by a transparent sheet of flexible plastic. This method allows freeform placement of photographs, and photographs of unusual sizes and shapes. The problem here is that the background cannot readily be colored or written upon. In addition, the method offers no assistance in arranging the photographs in symmetrical, reproducible patterns.

Yet other methods involve masks, in which a mask is placed over a collection of underlying photographs, where it is intended to remain permanently in place. In such methods, the mask acts as a decorative mat. Unfortunately, in that circumstance the masks are not reusable, and are therefore relatively expensive. Such masks are also limiting in that each mask only allows one pattern.

Templates have also been utilized in decorating and arranging photo albums. A template is typically a thin plastic plate with a cut pattern used as a guide in reproducing the pattern. Templates are known for guiding a user in cutting photographs to form shaped photographs which are ovals, hearts, stars, rectangles and other decorative shapes. But such templates do not assist the user in arranging the shaped photographs in decorative, reproducible patterns.

Templates have also been used to create collage puzzle pieces. In a method described in U.S. Pat. No. 5,865,928 issued to Lariviere et al. on Feb. 2, 1999, a template comprising a plurality of channel cutouts is used to form photographs into puzzle pieces which can later be combined to form a collage of interlocking pieces approximately forming a grid pattern. The template and method of Lariviere are limiting in that each piece of the grid pattern is fixed in size and shape, the method requires mounting the photographs to an adhesive backed substrate, the method results in pieces which are a combination of photograph and substrate, the template must be translucent, and the template must be as large as the pattern being created.

Therefore there is still a need for methods and devices used in arranging photographs in photo albums.

SUMMARY OF THE INVENTION

Methods and devices according to the present invention employ templates comprising a plurality of dedicated and unconnected framing cutouts arranged in a decorative multi-piece pattern to shape one or more photographs into a plurality of pieces. The pieces are arranged on a page to at least partially recreate the decorative multi-piece pattern as a puzzle of unlinked pieces. Tremendous variation is contemplated in puzzles derived from the templates. Among other things, the pieces of the puzzle patterns may be or may not be exploded, may or may not be symmetrical, and may or may not have some readily recognizable overall shape. On the other hand, the puzzles are readily reproducible, and may be aesthetically very pleasing. It is also contemplated that users can make repeated use of the templates.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 11 is a collection of puzzle patterns that can be created using the template of FIGS. 5 and 6.

FIG. 12 is a collection of puzzle patterns that can be created using the template of FIGS. 7 and 8.

FIG. 13 is a collection of puzzle patterns that can be created using the template of FIGS. 9 and 10.

DETAILED DESCRIPTION

Figure 1:
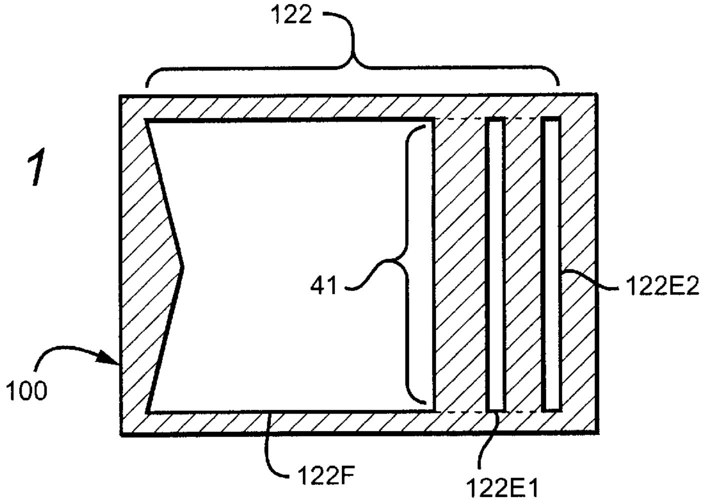
FIG. 1 is a cross-sectional view of a first template according to the present invention.

FIG. 1 depicts a template 100 having a subdivided cutout 122 comprising a frame 122F and two channels 122E1 and 122E2. (Cutout 122 is "subdivided" because it comprises a set of multiple smaller cutouts, 122F, 122E1, and 122E2.) Frame 122F has a perimeter comprising segments 41–44, and cutout 122 has a perimeter which can be varied so as to include segments 41–44, segments 42–44 and channel 122E 1, or segments 42–44 and channel 122E2. Thus, the size of cutout 122 can be varied depending on whether segment 41, channel 122E1, or channel 122E2 is used to close the perimeter between segments 42 and 44.

Figure 2:
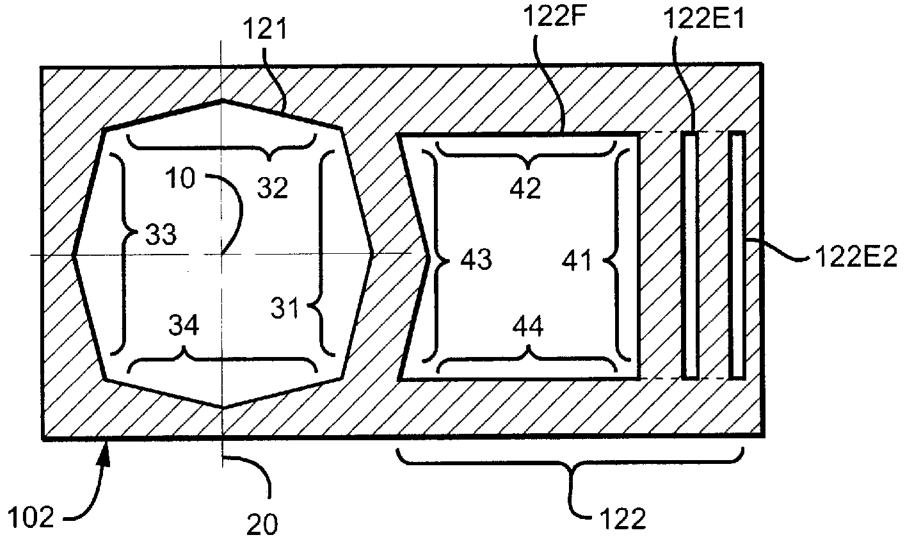
FIG. 2 is a cross-sectional view of a second template according to the present invention.

FIG. 2 depicts a template 102 having a non-subdivided cutout/frame 121 adjacent to a subdivided cutout 122 comprising a frame 122F and two extension cutouts/channels 122E1 and 122E2. The non-subdivided cutout 121 is symmetrical about a point 10 located in the center of the first non-subdivided cutout such that the perimeter of the first non-subdivided cutout comprises a plurality of substantially similar segments 31, 32, 33, and 34. The subdivided cutout 122 comprises a perimeter having a segment 43 sized and shaped to dovetail with one of the substantially similar segments 21–24 of the first non-subdivided cutout 121. Segment 43 is adjacent to but disjoint from segment 31 of non-subdivided cutout 121. Segments 32–34 are non-adjacent to any cutout.

Figure 3:
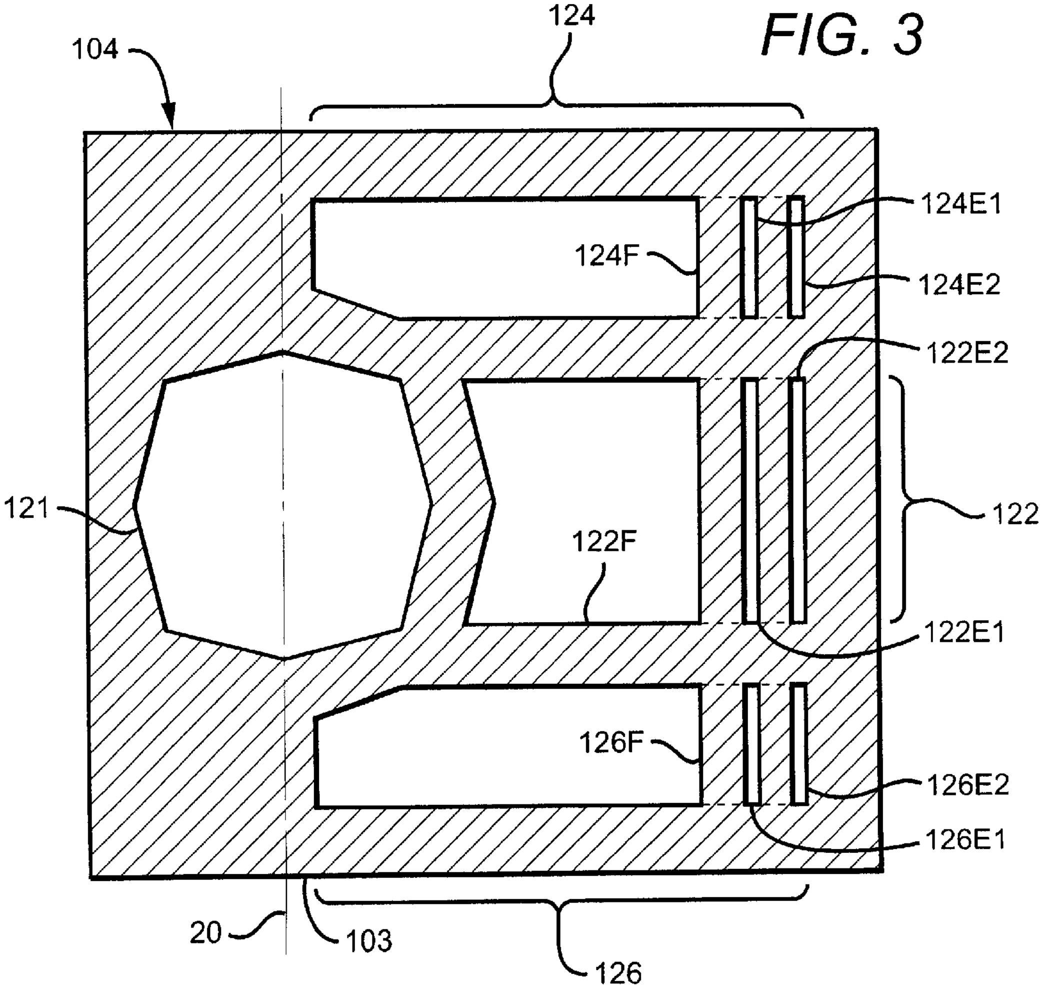
FIG. 3 is a cross-sectional view of a third template according to the present invention.

FIG. 3 depicts a template 104 having a non-subdivided cutout/frame 121, a first subdivided cutout 122 comprising a frame 122F and two extension cutouts/channels 122E1 and 122E2, a second subdivided cutout 124 comprising a frame 124F and two extension cutouts/channels 124E 1 and 124E2, and a third subdivided cutout 126 comprising a frame 126F and two extension cutouts/channels 126E1 and 126E2. Non-subdivided cutout 121 is symmetrical about an imaginary line 20 passing through the center of non-subdivided cutout 121, and the first, second, and third subdivided cutouts 122, 124, and 126 are located on one side of the imaginary line 20.

Frames 122F, 124F, and 126F of FIGS. 1–3 are thus named primarily because they allow a significant portion of a photograph located behind the template and overlapping the cutout area to be visible, even if the template is opaque. In contrast, channels 122E1, 122E2, 124E1, 124E2, 126E1, and 126E2 are sized and dimensioned in a manner which would make it difficult to see, if the template is opaque, a significant portion of a photograph located behind any one of the extension cutouts 122E1, 122E2, 124E1, 124E2, 126E1, and 126E2. Frames are thus contemplated as having sufficient length and width to frame a significant portion of a photograph and must have an area greater than 1 square inch, a portion of which has a length and a width greater than 1". Preferable embodiments have larger framing cutouts having minimum widths and heights of 1.5", 2" and 3", and/or areas of at least 2.25 square inches, 4 square inches, and 9 square inches.

Channels 122E1, 122E2, 124E1, 124E2, 126E1, and 126E2 of FIGS. 1–3 are sized and dimensioned for drawing or cutting a single line or curve rather than an area. To be a channel, a cutout must be elongated and have a width of less than 0.25". Channels 122E1, 122E2, 124E1, 124E1 may also be referred to as "extension" cutouts primarily because they allow frame 122F, 124F, and 126F to be extended by replacing a segment of the frame with a line reproduced with a channel. For instance, segment 41 of frame 122F can be replaced through the use of channel 122E1 or 122E2, and the use of one of the channels 122E1 or 122E2 thus enlarges or extends the perimeter of frame 122F.

The template of FIG. 3 can also be viewed as being a template 100 for drawing a first, a second, and a third design comprising, a first set of cutouts 121, 122F, 124F, and 126F corresponding to the first design; a second set of cutouts 121, 122F, 124F, 126F, 122E1, 124E1, and 126E1 corresponding to the second design, and a third set of cutouts 121, 122F, 124F, 126F, 122E2, 124E2, and 126E2 corresponding to the third design. As can be seen, the second and third set of cutouts include all of the cutouts of the first set of cutouts; the first, second and third sets are arranged to substantially duplicate the first, second, and third designs on the template and thus form first, second, and third template designs; all of the designs have similarly shaped perimeters; and the first template design perimeter is contained within the second template design perimeter and within the third template design perimeter. Note that all of the first set of cutouts are frames, and all of the second and third sets of cutouts which are not part of the first set of cutouts are channels.

A method for preparing and arranging photographs using the templates of FIGS. 1–3 might include the following steps: providing stencil 100 having a plurality of extendible (122, 124, and 126) and non-extendible (121) cutouts shaped and arranged to form a design on the stencil such that each cutout of the plurality of cutouts corresponds to a piece of the design; providing a first plurality of photographs; matching each photograph of the plurality of photographs to one of the plurality of cutouts such that each provided photograph corresponds to a piece of the design; choosing the size of each piece corresponding to an extendible cutout; using the stencil to modify each photograph so that the photograph has a size and shape approximating the size and shape of the piece to which it corresponds; arranging and affixing the modified first plurality of photographs on a surface so that the photographs approximately recreate the arrangement of the cutout portions on the stencil such that the photographs approximately recreate the design formed on the stencil by the cutout portions.

Figure 4:
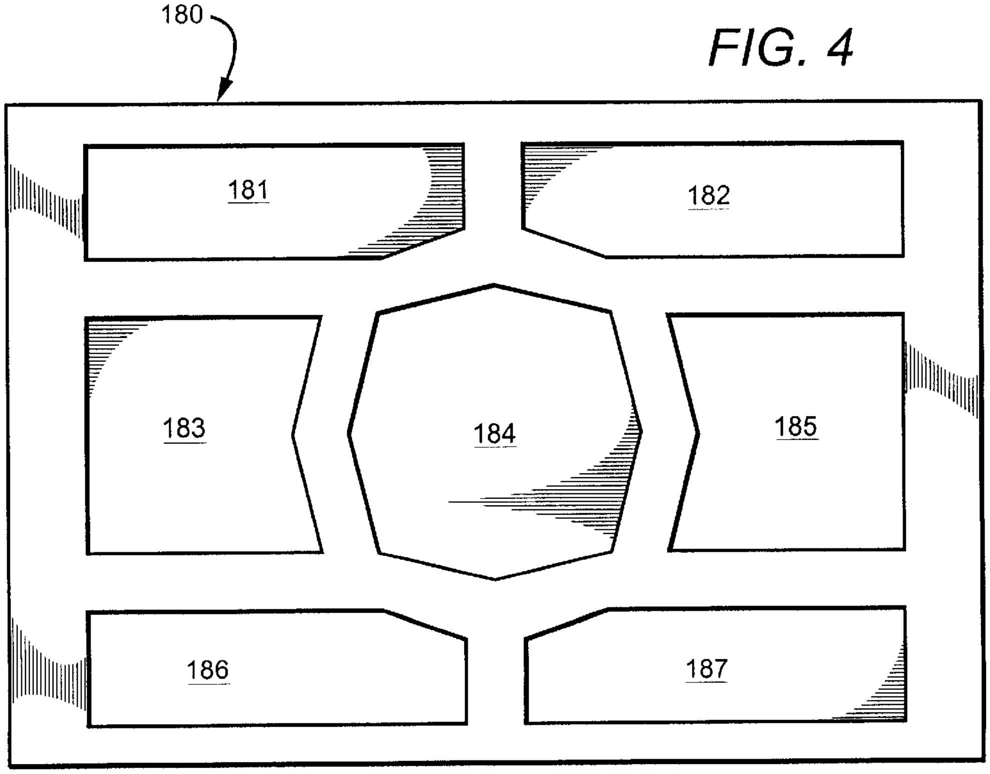
FIG. 4 is a plan view of a page laid out using the template of FIG. 3.

Such a method might also include the following steps: selecting a second plurality of photographs; dividing the plurality of cutouts into a set of overlapping cutouts (121) and a set of non-overlapping cutouts (122, 124, and 126), the overlapping cutouts (121) being symmetrical about an imaginary line passing through the centers of all the overlapping cutouts, and the set of non-overlapping cutouts (122, 124, and 126) being located on one side of imaginary line and thus to one side of the overlapping cutouts; turning the template over such that the non-overlapping cutouts (122, 124, and 126) are moved to the opposite side of the overlapping cutouts (121); matching each photograph of the second plurality of photographs to one of the non-overlapping (122, 124, and 126 cutouts such that each provided photograph of the second plurality of photographs corresponds to an additional piece of the design; choosing the size of each additional piece corresponding to an extendible non-overlapping cutout (122, 124, and 126); using the stencil to modify each photograph of the second plurality of photographs so that each photograph has a size and shape approximating the size and shape of the additional piece to which it corresponds; arranging and affixing the additional pieces to the surface to which the modified first plurality of photographs was affixed so as to modify the design formed by the modified first plurality of photographs into a balanced and symmetrical design. FIG. 4 depicts the layout of a page 180 which can be created using this method with the template of FIG. 3, for shaping and laying out photographs 181–187.

Templates 100 are generally contemplated to be manufactured from sheet plastic such as PETG. On the other hand, alternative materials may also be used, such as rubber or stiff paper. The composition of the templates 100 will generally determine their surface characteristics, and it may be desirable for surfaces of templates to have particular stickiness or slipperiness characteristics, to assist users in keeping the template in place, or allowing for free movement to make minute changes in placement. Alternatively, a coating could be applied to a template to alter surface characteristics.

As will be appreciated, templates are generally contemplated to be clear (i.e., transparent) to make it easier for the user to select cutout areas, but it may be advantageous to employ templates that are translucent or even opaque. Templates may also be colored for quick identification, such as red for hearts, blue for ovals and green for stars. Templates may also be patterned with a grid or picture. The thickness of the templates 100 is not critical, although it is preferable that they be thick enough to use in cutting and tracing of photographs, but thin enough to be flexible. Presently preferred templates 100 are on the order of 20 mils thick.

For convenience, templates 100 may be rectangularly shaped, measuring about the size of a normal piece of paper. Typical sizes may be 8⅓ by 11 inches, 11 by 14 inches, or 11 by 17 inches. Larger or smaller templates are also contemplated, and may be especially useful for customizing different projects. Each template comprises multiple cutouts, some of which may be a complete heart or other shape, while other cutouts may comprise only a half shape, such as half a heart or half a star. Obviously, if a user wanted to cut out a photograph in the shape of a full heart, she would trace the photographs from the half-cutout provided, and then flip it over to complete the page.

Referring to FIGS. 5–10, templates may also be provided with binder holes 140 for convenient storage in a three ring binder. The edges of the templates 100 may also have scalloped or other border shapes 150 to add to visual interest. In FIGS. 5–10, templates 100 comprise "dots" 160 which are used to create alignment marks, as will be readily appreciated.

Cutouts 121, 122, 124, and 126 are contemplated to cooperate with each other to produce a puzzle pattern. As used herein, the term "puzzle pattern" means a pattern formed by a collection of pieces which have at least one of (a) mating, non-orthogonal comers; (b) mating non-linear edges, and (c) mating inside and outside comers, (i.e. where one photograph extends into a space which one would normally expect to be occupied by another photograph). In this definition, the terms "comers" should be interpreted in its broadest sense to include any intersection of edges or sides, and not merely orthogonal intersections such as presented by a square or rectangle. Under the umbrella of these definitions, there are an enormous number of patterns and shapes which can be used in conjunction with the present inventive subject matter.

Figure 5:
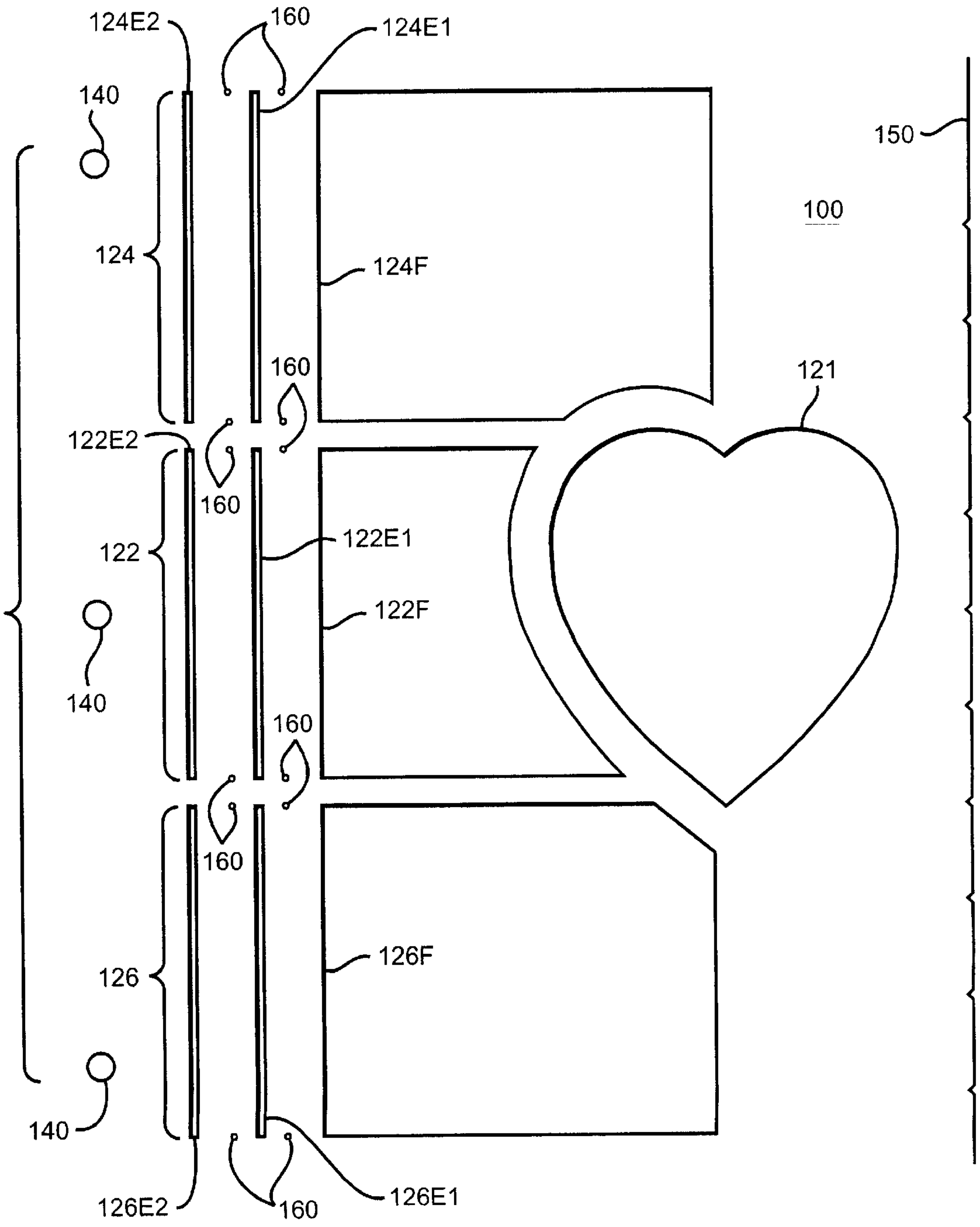
FIG. 5 is a plan view of a fourth template according to the present invention having a heart-related design.
Figure 6:
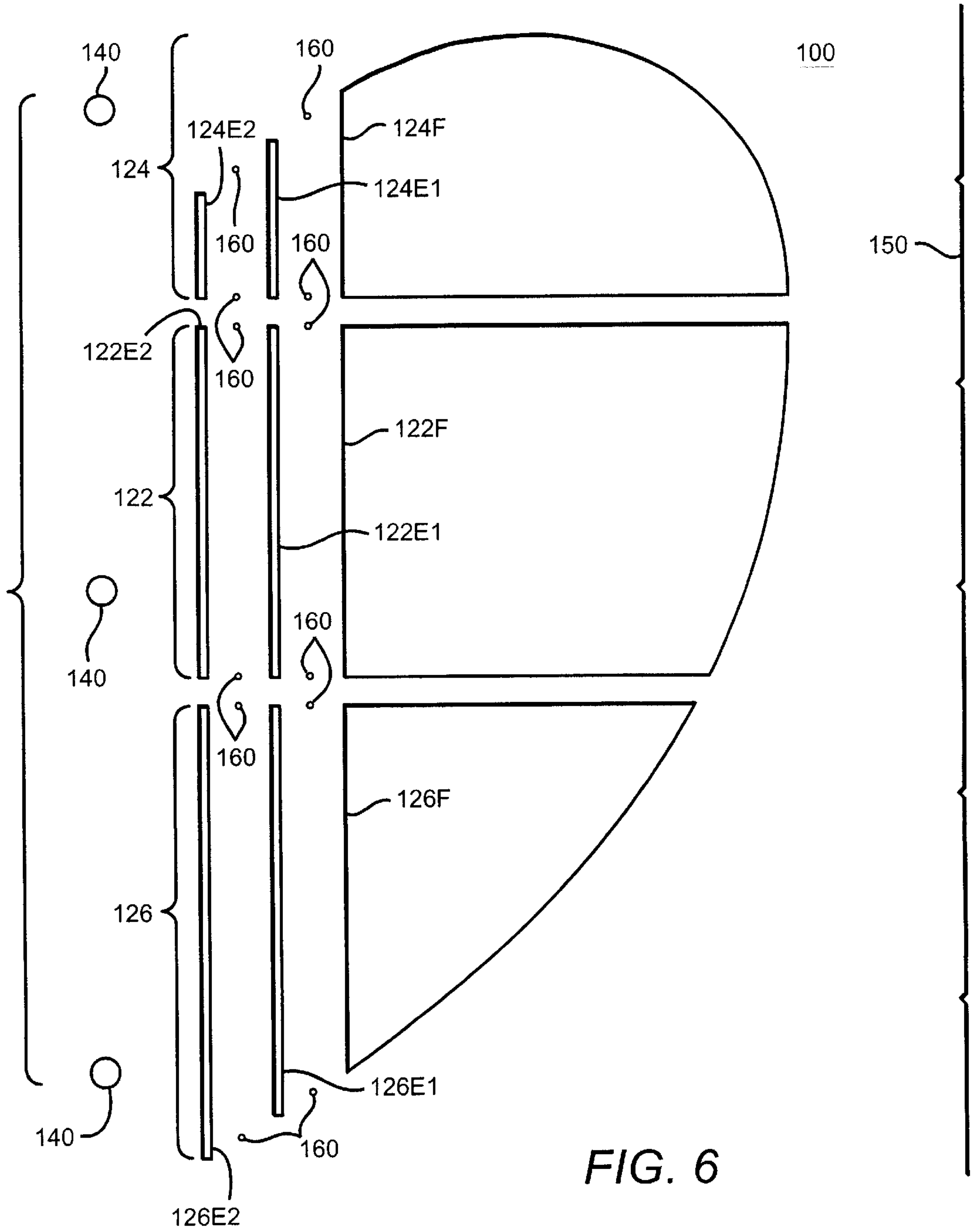
FIG. 6 is a plan view of a fifth template according to the present invention having a heart-related design.

In FIGS. 5 and 6, the puzzle patterns all deal with hearts, and the various cutouts 121, 122, 124 and 126 cooperate to produce such heart patterns. For example, in FIG. 5 cutout 121 is the shape of a heart. Cutout 124 is a rectangle with a section cut out to "fit" together with the upper part of the heart shape. Cutout 122 is generally rectangularly shaped, with a section cut out to "fit" together with the sides of the heart shape. Cutout 126 is again generally rectangularly shaped, with a section cut out to "fit" together with lower, pointed portion of the heart shape. Note that in FIGS. 5–10, extendible cutouts 122, 124, 126, and 128 comprise dots 160 in addition to the various channels. Dots 160 are cutouts designed for drawing a single point, are preferably circular, and are contemplated as having diameters less than 0.125 inches.

In FIGS. 5–10 the cutouts 121, 122, 124, 126, and 128 are all depicted as having smooth edges. Such edges are advantageous because they are easy to trace. It is contemplated, however, that edges may not be smooth, and may instead be ruffled, or have ridges, scallops or other patterns.

Figure 8:
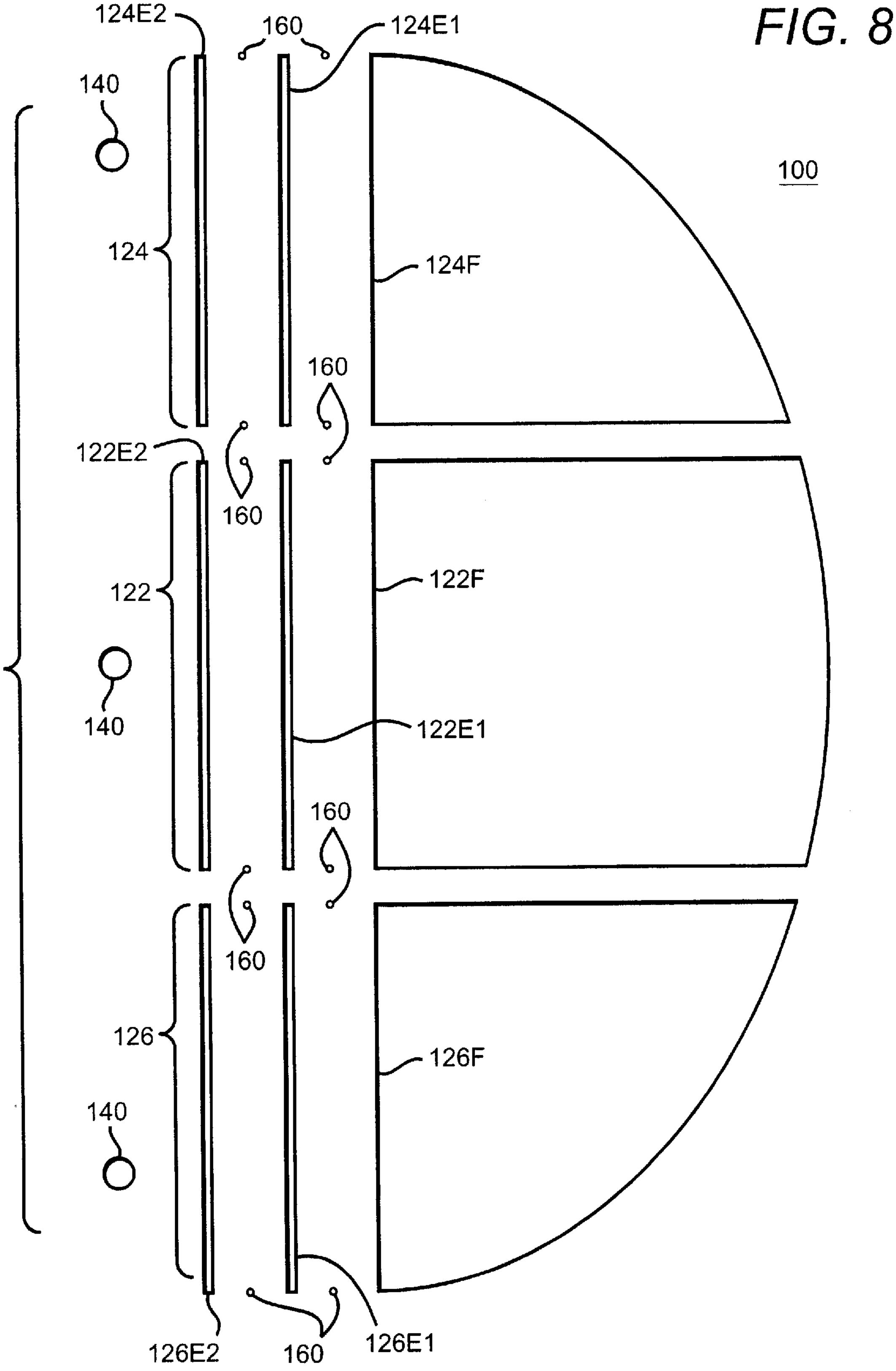
FIG. 8 is a plan view of a seventh template according to the present invention having a oval-related design.
Figure 9:
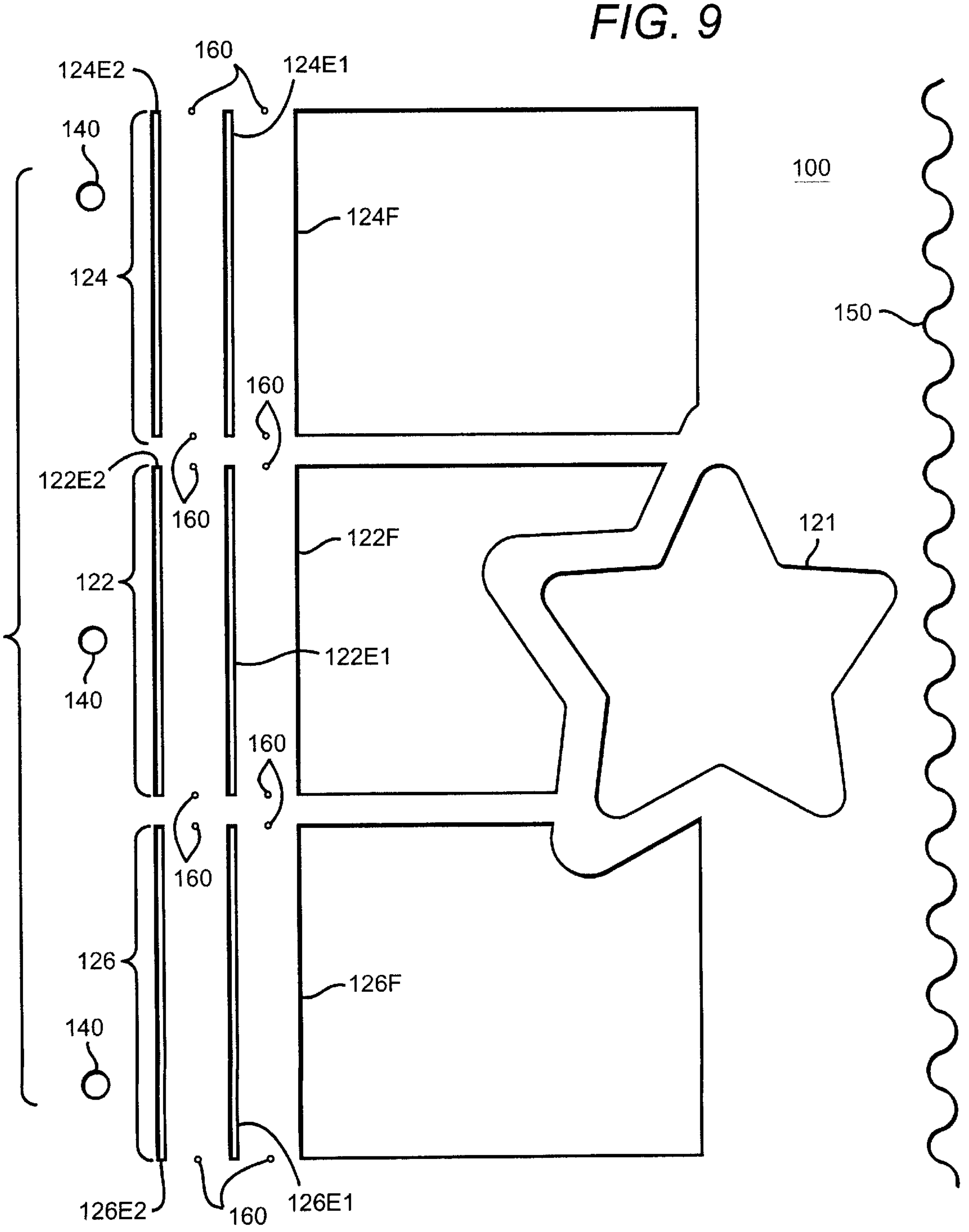
FIG. 9 is a plan view of a eighth template according to the present invention having a oval-related design.
Figure 10:
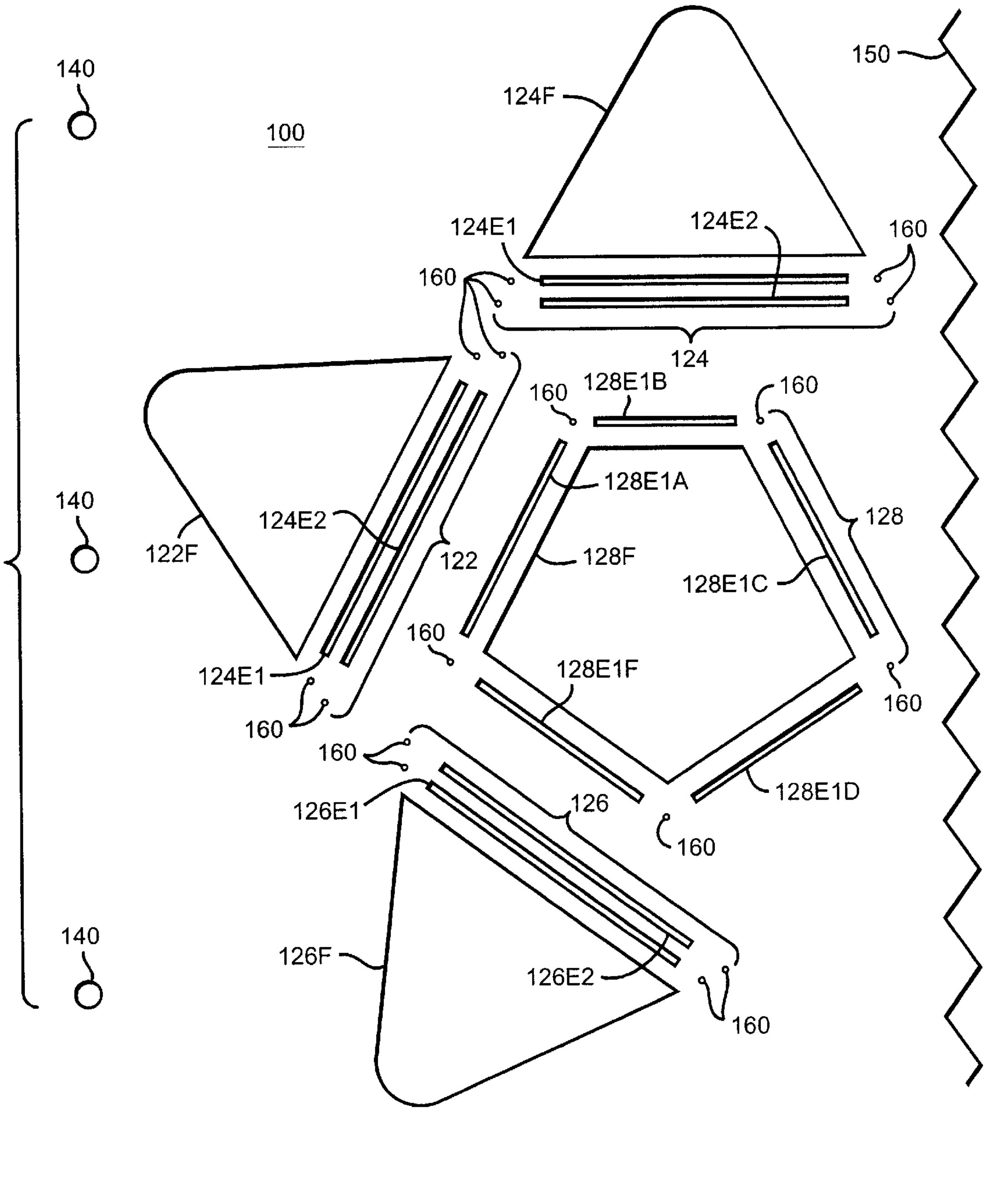
FIG. 10 is a plan view of a ninth template according to the present invention having a star-related design.

In FIGS. 5–10, lines/channels 122E1, 122E2, 124E1, 124E2, 126E1, and 126E2 (and in FIG. 10, 128E1A–128E1F) are used to extend the size of frames 122F, 124F, and 126F (and in FIG. 10, 128F). Thus, in FIG. 5, frame 124F by itself will produce a small almost square rectangle, while cutout 124F in conjunction with line 124E1 will produce a medium sized shape, while cutout 124F in conjunction with line 124E2 will produce a large sized shape. The same can be said of lines 122E1 and 122E2 with respect to cutout 122, and of lines 126E1 and 126E2 with respect to cutout 128.

FIG. 11 depicts some of the many heart-related puzzle patterns that can be produced using the templates of FIG. 5 or 6. In all of these patterns a distance, perhaps ¼, separates the photograph-puzzle pieces from one another". In this sense, the puzzle pattern is "exploded". It is important to note, however, that in alternative embodiments, some or all of the puzzle pieces, as arranged on a page, could touch one another, so that at least a portion of the puzzle pattern would then be non-exploded.

Figure 7:
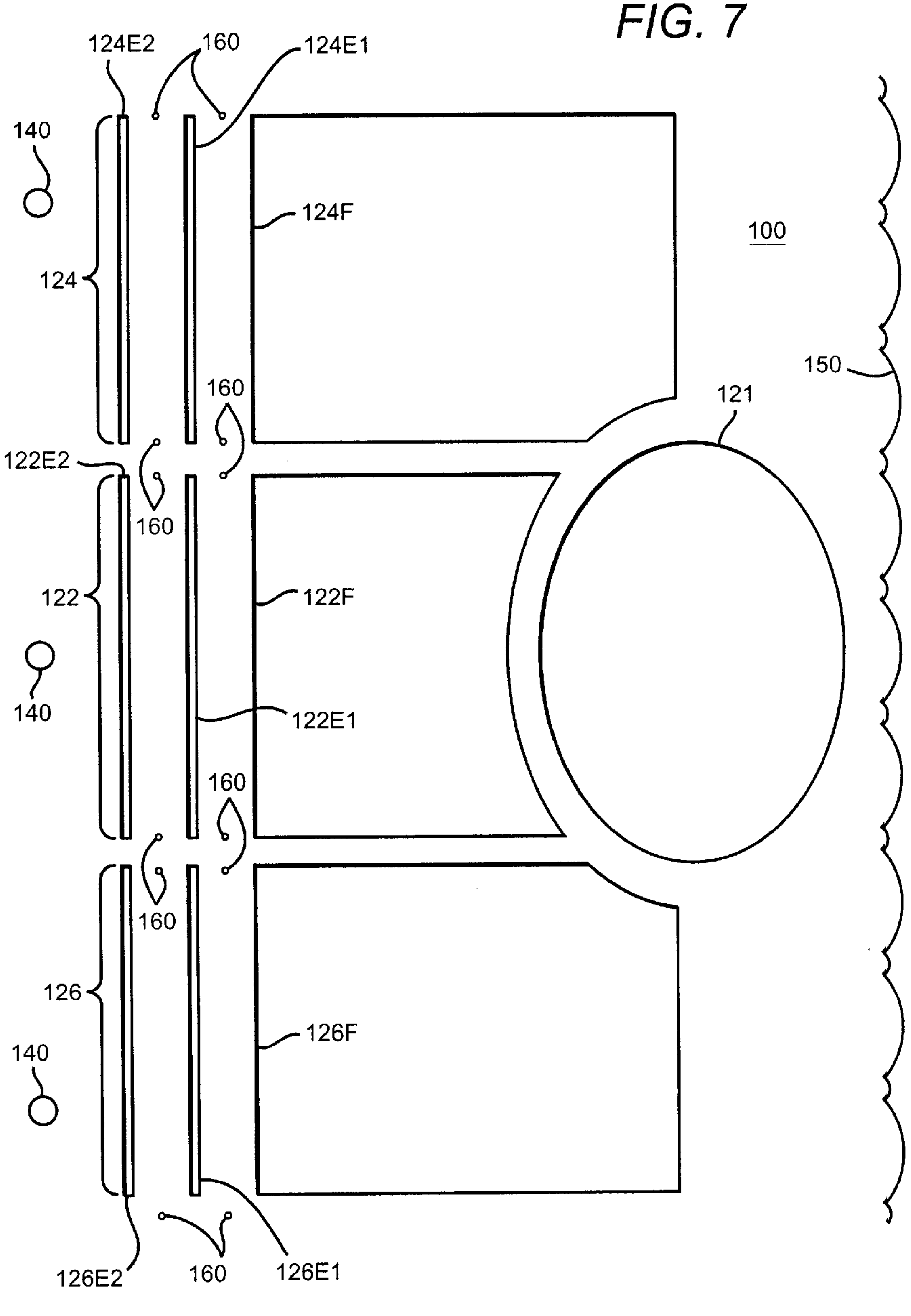
FIG. 7 is a plan view of a six th template according to the present invention having a oval-related design.

FIGS. 7, 8, and 12 are analogous to FIGS. 5, 6, and 11 respectively, except that the basic pattern here is an oval rather than a heart. Similarly, FIGS. 9, 10, and 13 are analogous to FIGS. 5, 6 and 11, respectively, except that the basic pattern is a star. Clearly, many other shapes and patterns could be used, such as diamonds or hexagons.

Thus, specific embodiments and applications of the templates have been disclosed. It should be apparent, however, to those skilled in the art that many more modifications besides those already described are possible without departing from the inventive concepts herein. For example, cutouts may be arranged differently on the templates than that shown in the Figures, and additional puzzle patterns made be produced with templates other than those shown.

What is claimed is:

1. A method for preparing and arranging cutout shapes comprising:

providing a template having a first stencil defining a first shape, a second stencil defining a second shape different from the first shape, and a slit;

utilizing the slit in combination with the second stencil to produce a plurality of cutouts; and arranging and separating the plurality of cutouts on a surface to approximate an extended version of the first shape.

2. The method of claim 1 wherein the cutouts are taken from a photograph.

3. The method of claim 1 wherein the cutouts are taken from a plurality of photographs.

4. The method of claim 1 wherein an additional slit provides for a different extension of the first shape.

5. The method of claim 1 wherein the first shape is one half of a symmetrical shape, further comprising:

utilizing the first stencil to produce a small cutout version of the first shape;

flipping over the template to produce a mirror image of the small cutout, and combining the small cutout with the mirror image and the plurality of cutouts to form the symmetrical shape surrounded by an extended version of the symmetrical shape.

6. The method of claim 1 wherein the first shape is a heart.

7. The method of claim 1 wherein the first shape is an oval.

8. The method of claim 1 wherein the first shape is a star.

9. The method of claim 1 wherein the step of arranging and separating the plurality of cutouts on a surface comprises forming the extended version of the first shape where none of the plurality of cutouts are touching any other of the plurality of cutouts.

* * * * *